United States Patent
Naruse

(10) Patent No.: US 9,529,386 B2
(45) Date of Patent: Dec. 27, 2016

(54) INFORMATION PROCESSING APPARATUS, DOCKING STATION, AND EXTERNAL DISPLAY CONTROL METHOD

(71) Applicant: KABUSHIKI KAISHA TOSHIBA, Minato-ku, Tokyo (JP)

(72) Inventor: Taku Naruse, Ome (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 395 days.

(21) Appl. No.: 14/152,620

(22) Filed: Jan. 10, 2014

(65) Prior Publication Data

US 2014/0365701 A1 Dec. 11, 2014

(30) Foreign Application Priority Data

Jun. 7, 2013 (JP) ................. 2013-121058

(51) Int. Cl.
- *G06F 1/16* (2006.01)
- *G06F 3/14* (2006.01)
- *G09G 5/00* (2006.01)

(52) U.S. Cl.
CPC ............. *G06F 1/1632* (2013.01); *G06F 3/14* (2013.01); *G06F 3/1431* (2013.01); *G09G 5/006* (2013.01); *G09G 2330/026* (2013.01); *G09G 2330/027* (2013.01); *G09G 2370/04* (2013.01)

(58) Field of Classification Search
None
See application file for complete search history.

(56) References Cited

U.S. PATENT DOCUMENTS

| 5,627,974 A | * | 5/1997 | Watts, Jr. ............... G06F 1/1632 361/679.41 |
| 5,666,497 A | * | 9/1997 | Milhaupt ............... G06F 1/1616 710/305 |

(Continued)

FOREIGN PATENT DOCUMENTS

| JP | 11-143598 | 5/1999 |
| JP | 2007-225980 | 9/2007 |

OTHER PUBLICATIONS

'Universal Laptop Docking Station Monitor Connection Guide' by Kensington, archived at Kensington.com from Jun. 18, 2015.*

(Continued)

*Primary Examiner* — Steven Snyder
(74) *Attorney, Agent, or Firm* — Knobbe, Martens, Olson & Bear LLP

(57) ABSTRACT

According to one embodiment, an information processing apparatus includes a first logic circuit, a second logic circuit and a controller. The first logic circuit selectively supplies either the detection signal indicating the connection of the external display to a first connector or the detection signal indicating the connection of the external display to a second connector on an extension unit to the input/output port. The second logic circuit switches between supplying the detection signal to the input/output port and cutting off the detection signal to the input/output port. The controller controls the second logic circuit to cut off the supply of the detection signal to the input/output port for a first period when the extension unit is attached or detached.

9 Claims, 5 Drawing Sheets

(56) References Cited

U.S. PATENT DOCUMENTS

| | | | | |
|---|---|---|---|---|
| 5,682,529 A * | 10/1997 | Hendry | G06F 3/14 | 710/16 |
| 5,721,933 A * | 2/1998 | Walsh | G06F 1/1632 | 307/31 |
| 5,948,074 A * | 9/1999 | Ninomiya | G06F 1/1632 | 361/679.41 |
| 5,991,839 A * | 11/1999 | Ninomiya | G06F 1/1632 | 710/303 |
| 6,029,215 A * | 2/2000 | Watts, Jr. | G06F 1/1632 | 361/679.32 |
| 6,088,620 A * | 7/2000 | Ninomiya | G06F 1/1632 | 700/16 |
| 6,243,727 B1 * | 6/2001 | Watts, Jr. | G06F 1/1632 | 361/679.08 |
| 6,285,911 B1 * | 9/2001 | Watts, Jr. | G06F 1/1632 | 361/679.41 |
| 6,341,320 B1 * | 1/2002 | Watts, Jr. | G06F 1/1632 | 361/679.42 |
| 6,864,891 B2 * | 3/2005 | Myers | G06F 1/1632 | 345/1.1 |
| 7,423,610 B2 * | 9/2008 | Hansen | G06F 1/1613 | 345/1.2 |
| 7,472,215 B1 * | 12/2008 | Mok | G06F 1/1632 | 165/80.3 |
| 7,477,247 B2 * | 1/2009 | Yee | G09G 5/006 | 345/204 |
| 7,649,735 B2 * | 1/2010 | Iwaki | G06F 1/1632 | 250/492.1 |
| 7,660,930 B2 * | 2/2010 | Mok | G06F 1/1632 | 165/80.3 |
| 7,676,619 B2 * | 3/2010 | Mok | G06F 1/1632 | 165/80.3 |
| 7,676,620 B2 * | 3/2010 | Mok | G06F 1/1632 | 165/80.3 |
| 7,694,057 B2 * | 4/2010 | Mok | G06F 1/1632 | 165/80.3 |
| 7,702,837 B2 * | 4/2010 | Mok | G06F 1/1632 | 165/80.3 |
| 7,711,884 B2 * | 5/2010 | Mok | G06F 1/1632 | 165/80.3 |
| 7,739,439 B2 * | 6/2010 | Mok | G06F 1/1632 | 165/80.3 |
| 7,761,641 B2 * | 7/2010 | Mok | G06F 1/1632 | 165/80.3 |
| 7,788,436 B2 * | 8/2010 | Mok | G06F 1/1632 | 165/80.3 |
| 7,793,027 B2 * | 9/2010 | Mok | G06F 1/1632 | 257/712 |
| 7,925,813 B2 * | 4/2011 | Mok | G06F 1/1632 | 165/80.3 |
| 8,081,443 B2 * | 12/2011 | Iwaki | G06F 1/1632 | 250/492.1 |
| 8,260,999 B2 * | 9/2012 | Ganesh | G01C 21/265 | 710/300 |
| 8,730,230 B2 * | 5/2014 | Shiuan | G06F 3/1431 | 345/1.1 |
| 8,907,986 B2 * | 12/2014 | Hunt | G06F 1/1626 | 345/659 |
| 2002/0038400 A1 * | 3/2002 | Fukushima | G06F 1/1616 | 710/300 |
| 2004/0039862 A1 * | 2/2004 | Hunt | G06F 1/1626 | 710/304 |
| 2004/0075621 A1 * | 4/2004 | Shiuan | G09G 5/18 | 345/1.1 |
| 2006/0161713 A1 * | 7/2006 | Belady | B60R 11/0235 | 710/303 |
| 2006/0181480 A1 * | 8/2006 | Yee | G09G 5/006 | 345/3.1 |
| 2007/0112989 A1 * | 5/2007 | Iwaki | G06F 1/1632 | 710/303 |
| 2009/0037825 A1 * | 2/2009 | Thrasher | G06F 1/3203 | 715/748 |
| 2009/0187677 A1 * | 7/2009 | Hunt | G06F 1/1626 | 710/14 |
| 2010/0091445 A1 * | 4/2010 | Iwaki | G06F 1/1632 | 361/679.41 |
| 2014/0176393 A1 * | 6/2014 | Endo | G06F 3/1423 | 345/1.1 |

OTHER PUBLICATIONS

'Plugable UD-3900 USB 3.0 Universal Docking Station with Dual Video Outputs for Windows 8, 7, XP (HDMI and DVI/VGA to 2048×1152, Gigabit Ethernet, Audio, 2 USB 3.0 Ports, 4 USB 2.0 Ports, 4A AC Power Adapter)' archived at plugable.com from Aug. 23, 2013.*

* cited by examiner

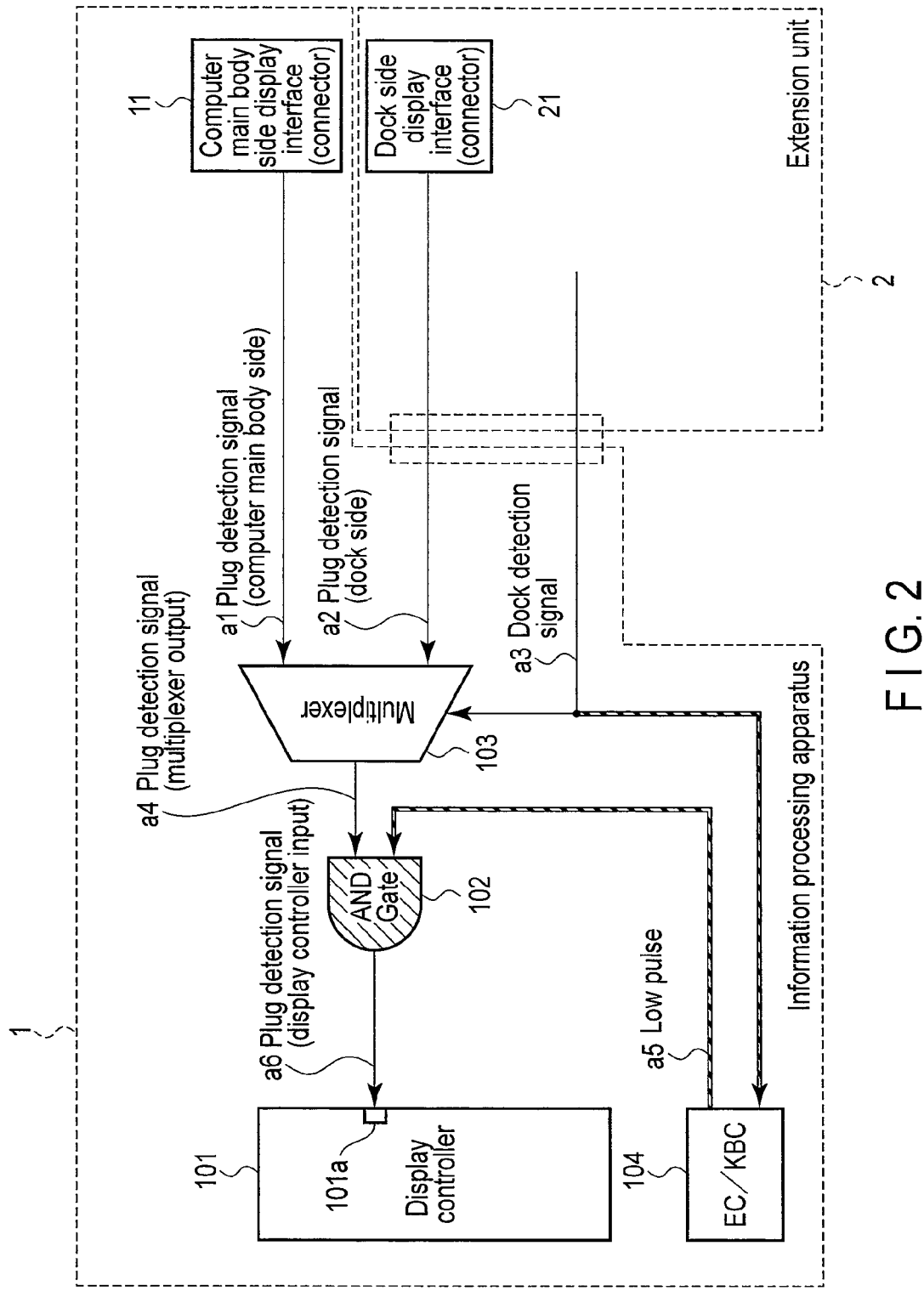
F I G. 2

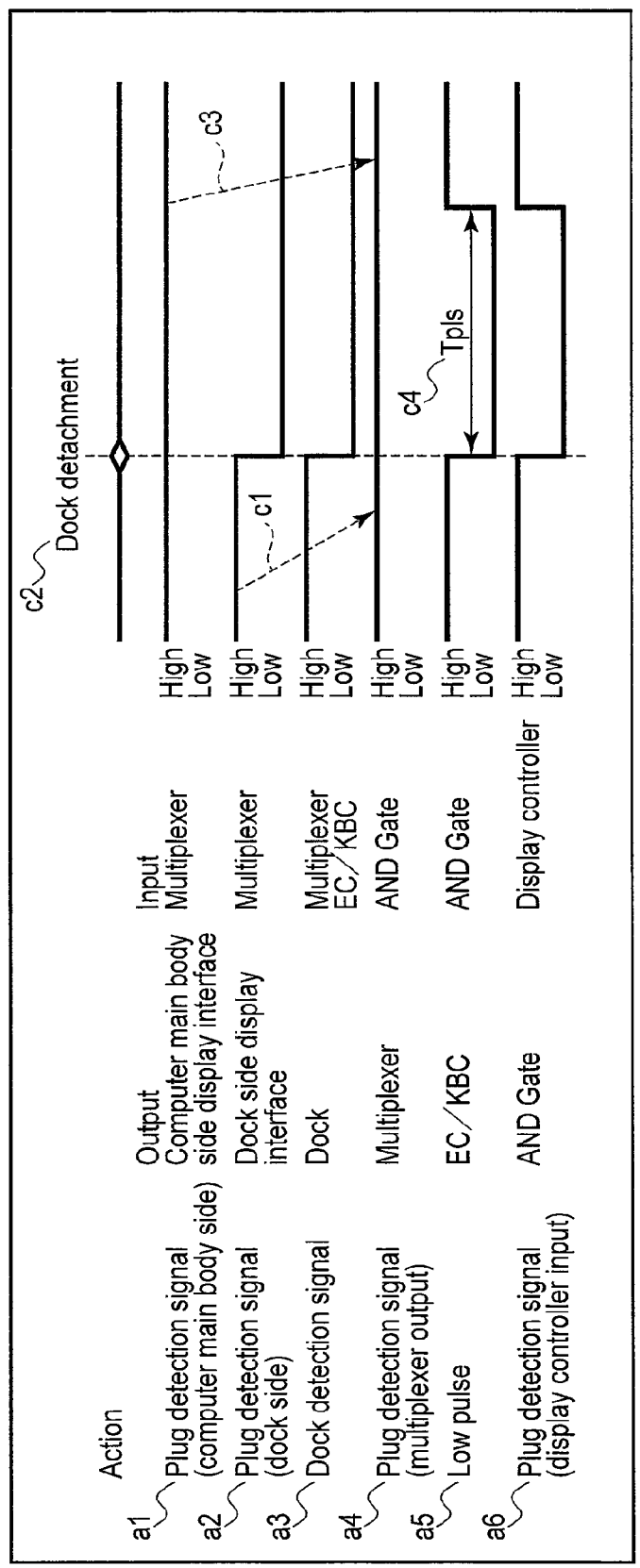
F I G. 4

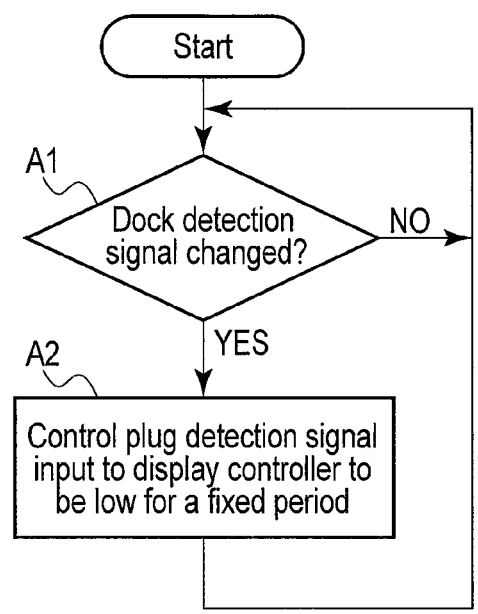
F I G. 5

INFORMATION PROCESSING APPARATUS, DOCKING STATION, AND EXTERNAL DISPLAY CONTROL METHOD

CROSS-REFERENCE TO RELATED APPLICATIONS

This application is based upon and claims the benefit of priority from Japanese Patent Application No. 2013-121058, filed Jun. 7, 2013; the entire contents of which are incorporated herein by reference.

FIELD

Embodiments described herein relate generally to an information processing apparatus to which an extension unit called a dock, a docking station, etc. can be detachably attached.

BACKGROUND

In recent years, a computer which can be powered by a battery and is easy to carry, such as a notebook computer, has become widespread. This kind of computer is sometimes configured to be detachably attached to an extension unit called a dock, a docking station, etc.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram concerning a structure for switching a display device when the extension unit of the information processing apparatus of the embodiment is attached or detached.

FIG. 4 is an exemplary drawing for explaining an operation when the extension unit of the information processing apparatus of the embodiment is detached (where the external display is connected to both the information processing apparatus and the extension unit).

FIG. 5 is an exemplary flowchart showing an operation procedure concerning attachment or detachment of the extension unit of the information processing apparatus of the embodiment.

DETAILED DESCRIPTION

Various embodiments will be described hereinafter with reference to the accompanying drawings.

In general, according to one embodiment, an information processing apparatus includes a first connector, a connecting portion, a display controller, a first logic circuit, a second logic circuit, and a controller. The first connector is configured to connect to an external display. The connecting portion is configured to detachably connect to an extension unit including a second connector, the second connector configured to connect to the external display. The display controller is configured to assign an input/output port for receiving a detection signal indicating a connection of the external display. The first logic circuit is configured to selectively supply either the detection signal indicating the connection of the external display to the first connector or the detection signal indicating the connection of the external display to the second connector from the extension unit through the connecting portion to the input/output port. The second logic circuit is between the input/output port and the first logic circuit and is configured to switch between supplying the detection signal output from the first logic circuit to the input/output port and cutting off the detection signal output from the first logic circuit to the input/output port. The controller is configured to control the second logic circuit to cut off the supply of the detection signal output from the first logic circuit to the input/output port for a first period when the extension unit is attached or detached.

Figure 1:
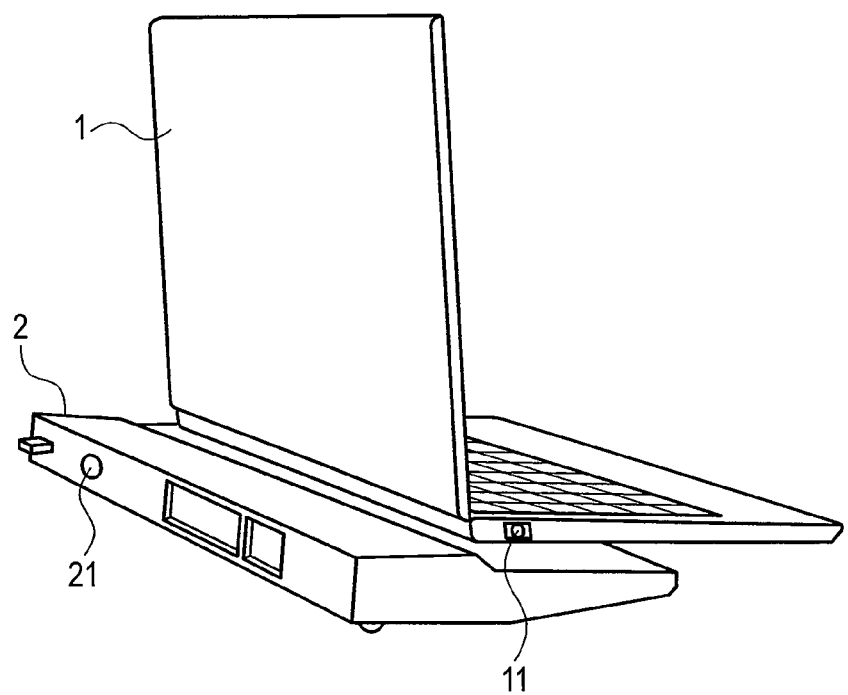
FIG. 1 is an exemplary drawing illustrating an external appearance when an extension unit of an information processing apparatus of an embodiment is attached.

FIG. 1 is an exemplary drawing illustrating an external appearance when an extension unit 2 of an information processing apparatus 1 of an embodiment is attached. The information processing apparatus 1 can be realized, for example, as a notebook computer. Also, as shown in FIG. 1, the extension unit 2 which is called a dock, a docking station, etc. can be detachably attached to the information processing apparatus 1.

Although it is not shown in FIG. 1, a display such as a liquid crystal display (LCD) is located at an internal surface of a cover of the information processing apparatus 1. Also, a connector 11 to which an external display can be connected is provided at a side surface of a main body of the information processing apparatus 1. For example, a user can see a display image of the information processing apparatus 1 on a large screen of the external display, instead of a built-in display, by connecting a large-screen external display to connector 11.

A connector 21 to which the external display can be connected is provided also in the extension unit 2. Thus, the external display can be connected to both connector 11 of the information processing apparatus 1 and connector 21 of the extension unit 2. In this case, the display image is output on the external display of the extension unit 2. Also, the extension unit 2 can be attached to the information processing apparatus 1 in a state where the external display is connected to both connector 11 of the information processing apparatus 1 and connector 21 of the extension unit 2. Conversely, the extension unit 2 can be detached from the information processing apparatus 1 in a state where the external display is connected to both connector 11 of the information processing apparatus 1 and connector 21 of the extension unit 2. In this case, although the external display is connected before and after the extension unit 2 is attached or detached, an output destination of the display image has to be properly switched.

In the information processing apparatus 1 of this embodiment, the structure for switching the display device when the extension unit 2 is attached or detached is constructed at low cost, and the information processing apparatus 1 will be explained as follows.

FIG. 2 is an exemplary block diagram concerning the structure for switching the display device when the extension unit 2 of the information processing apparatus 1 is attached or detached.

An output of the display image in the information processing apparatus 1 is controlled by a display controller 101. The display controller 101 sets the output destination of the display image to an internal display if the external display is not connected, and sets the output destination of the display image to the external display if the external display is connected. Also, if the extension unit 2 is attached and the external display is attached to both the information processing apparatus 1 and the extension unit 2, the display controller 101 sets the output destination of the display image to the external display of the extension unit 2.

The display controller 101 includes some input/output ports, and one of them (an input/output port 101*a*) is assigned for inputting a detection signal indicating a connection of the external display. The display controller 101 detects attachment or detachment of the external display by the detection signal supplied to the input/output port 101*a*. If the connection of the external display is detected, processing for recognizing connection status of the external display, the processing for obtaining information of the external display, etc. are executed.

A plug detection signal a1 and a plug detection signal a2 are present as the detection signal which can be input to the input/output port 101*a* of the display controller 101. Plug detection signal a1 goes high if the external display is connected to connector 11 of the information processing apparatus 1. Plug detection signal a2 goes high if the external display is connected to connector 21 of the extension unit 2 (attached to the information processing apparatus 1). Plug detection signal a1 and plug detection signal a2 are input to a multiplexer 103. Either plug detection signal a1 or plug detection signal a2 is exclusively selected and output by the multiplexer 103. More specifically, the multiplexer 103 is configured to output plug detection signal a1 when the extension unit 2 is not yet attached and to output plug detection signal a2 when the extension unit 2 is attached, based on a dock detection signal a3 indicating the attachment of the extension unit 2.

The display controller 101 recognizes that the external display is connected if the previously continuously low detection signal supplied to the input/output port 101*a* goes high, and, conversely, recognizes that the external display is detached if the previously continuously high detection signal goes low. In order not to misrecognize the attachment or detachment of the external display because of jitter during transition of the detection signal, the display controller 101 does not recognize that the external display is, for example, connected the instant the detection signal goes high, but recognizes the fact when the high state has continued for a fixed period after the transition.

Then, suppose the extension unit 2 in which the external display is connected to connector 21 is attached to the information processing apparatus 1 in which the external display is connected to connector 11. In this case, the display controller 101 switches the output destination of the display image from the external display of the information processing apparatus 1 to that of the extension unit 2.

If the external display is connected to connector 11, plug detection signal a1 is high, and plug detection signal a1 is output from the multiplexer 103 when the extension unit 2 is not yet attached. Then, when the extension unit 2 is attached, plug detection signal a2 is output from the multiplexer 103. Since the external display is connected to connector 21, plug detection signal a2 is also high. That is, the signal output from the multiplexer 103 does not change before or after the attachment of the extension unit 2. Similarly, the signal output from the multiplexer 103 does not change before or after the detachment of the extension unit 2 (where the external display is connected to both the information processing apparatus 1 and the extension unit 2).

Accordingly, an AND gate 102 is first provided between the input/output port 101*a* of the display controller 101 and the multiplexer 103 in the information processing apparatus 1. It should be noted that a plug detection signal output from the multiplexer 103 is represented as a plug detection signal a4, and a plug detection signal (output from the AND gate 102 and) input to the input/output port 101*a* of the display controller 101 is represented as a plug detection signal a6 for convenience.

Secondly, the information processing apparatus 1 leads the dock detection signal a3 indicating the attachment of the extension unit 2 also to an embedded controller/key board controller (EC/KBC) 104, and if the level of the dock detection signal a3 changes, a low pulse a5 (for making plug detection signal a6 low) is supplied from the EC/KBC 104 to the AND gate 102 for a fixed period. The EC/KBC 104 always supplies a high signal to the AND gate 102. If the level of the dock detection signal a3 changes, the low pulse a5 is supplied to the AND gate 102 only for a fixed period.

The period for which the EC/KBC 104 outputs the low pulse a5 is longer than the period defined in order for the display controller 101 not to misrecognize the attachment or detachment of the external display. The EC/KBC 104 is a single-chip microcomputer including an embedded controller configured to manage a power, and a key board controller configured to control data input. It should be noted that in this example, the EC/KBC 104 is a supply destination of the dock detection signal a3 and a generation source of the low pulse a5 based on the dock detection signal a3. However, the supply destination and the generation source are not limited to this case.

First, an operation when the extension unit 2 of the information processing apparatus 1 is attached (where the external display is connected to both the information processing apparatus 1 and the extension unit 2) will be explained with reference to FIG. 3.

If the external display is connected to connector 11 of the information processing apparatus 1, plug detection signal a1 is high. Also, since plug detection signal a1 is output from the multiplexer 103 when the extension unit 2 is not attached (i.e., when the dock detection signal a3 is low), plug detection signal a4 is high (b1 in FIG. 3). Also, since the low pulse a5 is not supplied from the EC/KBC 104 to the AND gate 102, plug detection signal a6 input to the input/output port 101*a* of the display controller 101 is also high.

Figure 3:
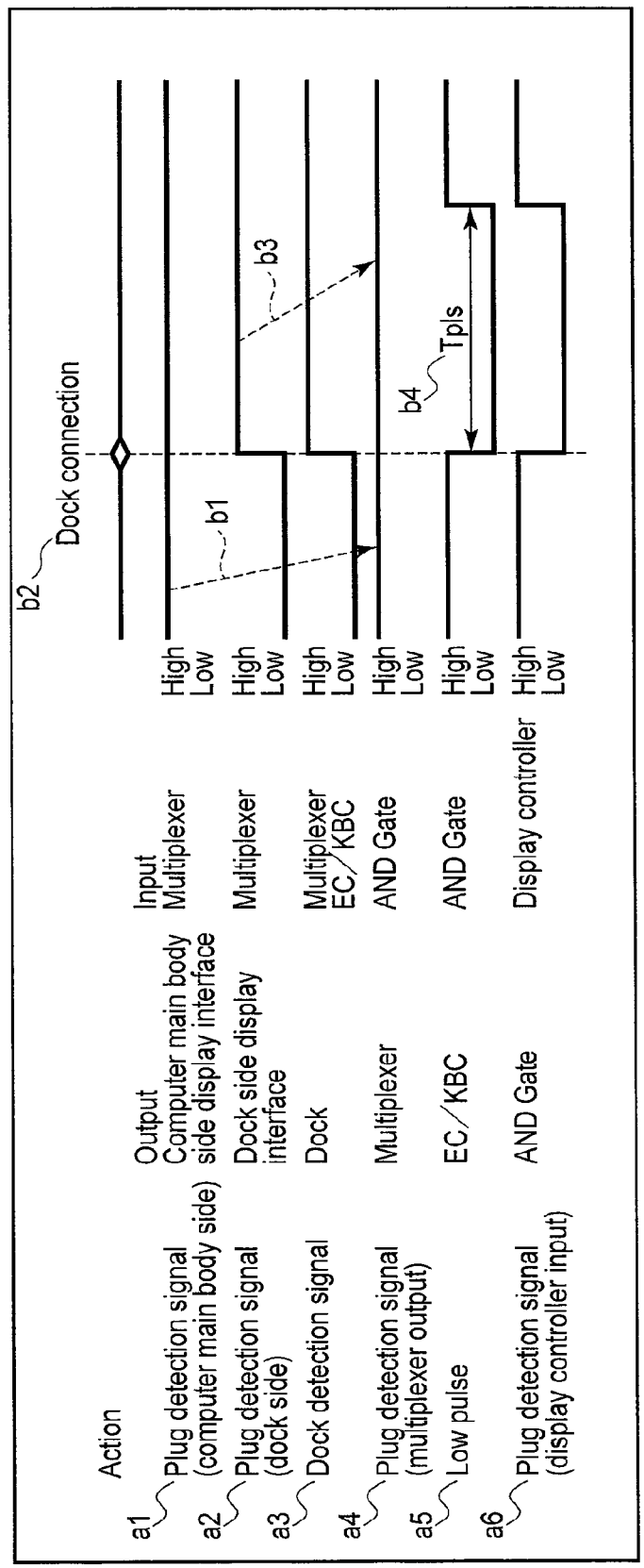
FIG. 3 is an exemplary drawing for explaining an operation when the extension unit of the information processing apparatus of the embodiment is attached (where an external display is connected to both the information processing apparatus and the extension unit).

When the extension unit 2 is attached (b2 in FIG. 3), the dock detection signal a3 is high, and plug detection signal a2 is output from the multiplexer 103, instead of plug detection signal a1 (b3 in FIG. 3). Since the external display is connected to the extension unit 2, plug detection signal a4 is also high.

The dock detection signal a3 is supplied not only to the multiplexer 103 but to the EC/KBC 104. When the dock detection signal a3 goes high, the low pulse a5 is supplied from the EC/KBC 104 to the AND gate 102 for a fixed period (b4 in FIG. 3). Thus, plug detection signal a6 input to the input/output port 101*a* of the display controller 101 for the fixed period goes low. Naturally, plug detection signal a6 input to the input/output port 101*a* of the display controller 101 goes high again after the fixed period passes.

This allows the display controller 101 to obtain timing for detecting the attachment of the external display, and to switch the output destination of the display image from the external display of the information processing apparatus 1 to that of the extension unit 2.

Next, an operation when the extension unit 2 of the information processing apparatus 1 is detached (where the external display is connected to both the information processing apparatus 1 and the extension unit 2) will be explained with reference to FIG. 4.

If the external display is connected to connector 21 of the extension unit 2, plug detection signal a2 is high. Also, since plug detection signal a2 is output from the multiplexer 103 when the extension unit 2 is attached (i.e., when the dock detection signal a3 is high), plug detection signal a4 is high (c1 in FIG. 4). Also, since the low pulse a5 is not supplied from the EC/KBC 104 to the AND gate 102, plug detection signal a6 input to the input/output port 101a of the display controller 101 is also high.

After that, when the extension unit 2 is detached (c2 in FIG. 4), the dock detection signal a3 goes low and plug detection signal a1 is output from the multiplexer 103, instead of plug detection signal a2 (c3 in FIG. 4). Since the external display is connected to the information processing apparatus 1, plug detection signal a1 is also high.

The dock detection signal a3 is supplied not only to the multiplexer 103 but to the EC/KBC 104. When the dock detection signal a3 goes low, the low pulse a5 is supplied from the EC/KBC 104 to the AND gate 102 for a fixed period (c4 in FIG. 4). Thus, plug detection signal a6 input to the input/output port 101a of the display controller 101 is low for the fixed period. Naturally, plug detection signal a6 input to the input/output port 101a of the display controller 101 goes high again after the fixed period passes.

This allows the display controller 101 to obtain the timing for detecting the attachment of the external display, and to switch the output destination of the display image from the external display of the extension unit 2 to that of the information processing apparatus 1.

FIG. 5 is an exemplary flowchart showing an operation procedure concerning attachment or detachment of the extension unit 2 of the information processing apparatus 1.

The EC/KBC 104 monitors whether the dock detection signal a3 indicating the attachment of the extension unit 2 changes or not (block A1), supplies the low pulse a5 to the AND gate 102 when it detects the change of the dock detection signal a3 (YES in block A1), and forces plug detection signal a6 supplied to the input/output port 101a of the display controller 101 to be low for a fixed period (block A2).

It should be noted that plug detection signal a6 supplied to the input/output port 101a of the display controller 101 is low for a fixed period also when the extension unit 2 is attached or detached under a situation other than the situation that the external display is connected to both the information processing apparatus 1 and the extension unit 2. No problem occurs in either case. After the fixed period passes, the output destination of the display image is the built-in display if plug detection signal a6 is low, and conversely, if it is high, the destination is the external display connected to the information processing apparatus 1 (when the extension unit 2 is detached) or the external display connected to the extension unit 2 (when the extension unit 2 is attached).

As shown above, the AND gate 102 is provided between the input/output port 101a of the display controller 101 and the multiplexer 103 in the information processing apparatus 1 of this embodiment, and the output destination of the display image can be properly switched by a simple structure for keeping the signal supplied to the input/output port 101a of the display controller 101 low for a fixed period when the extension unit 2 is attached or detached. That is, the structure for switching the display device when the extension unit is attached or detached can be constructed at low cost.

The above-explained structure is not limited to the switch between the information processing apparatus 1 side and the extension unit 2 side, and can be applied to a general system for switching a device using a multiplexer.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a first connector configured to connect to an external display;
   a connecting portion configured to detachably connect to an extension unit comprising a second connector, the second connector configured to connect to the external display;
   a display controller configured to assign an input/output port for receiving a supplied detection signal indicating a connection of the external display;
   a first logic circuit configured to selectively supply either a detection signal indicating the connection of the external display to the first connector or a detection signal indicating the connection of the external display to the second connector from the extension unit through the connecting portion to the input/output port;
   a second logic circuit between the input/output port and the first logic circuit and configured to switch between supplying the supplied detection signal output from the first logic circuit to the input/output port and cutting off the supplied detection signal output from the first logic circuit to the input/output port; and
   a controller configured to control the second logic circuit to cut off the supply of the supplied detection signal output from the first logic circuit to the input/output port for a first period when the extension unit is attached or detached.

2. The apparatus of claim 1, wherein the display controller is configured to recognize attachment or detachment of the external display when a value of a signal received by the input/output port changes and a state after the change continues for a second period less than or equal to the first period.

3. The apparatus of claim 2, wherein the first logic circuit is configured to output the detection signal indicating the connection of the external display to the first connector when the extension unit is unattached, and to output the detection signal indicating the connection of the external display to the second connector when the extension unit is attached, based on a second detection signal indicating the attachment of the extension unit.

4. The apparatus of claim 3, wherein the first logic circuit comprises a multiplexer.

5. The apparatus of claim 1, wherein the first logic circuit is configured to output the detection signal indicating the connection of the external display to the first connector when the extension unit is unattached, and to output the detection signal indicating the connection of the external display to the second connector when the extension unit is attached, based on a second detection signal indicating the attachment of the extension unit.

6. The apparatus of claim 5, wherein the first logic circuit comprises a multiplexer.

7. The apparatus of claim 1, wherein the second logic circuit comprises an AND gate configured to output a signal indicating a logical product of a value of the supplied detection signal output from the first logic circuit and a value of a control signal output from the controller.

8. A control method of an information processing apparatus comprising a first connector configured to connect to an external display, a connecting portion configured to detachably connect to an extension unit comprising a second connector configured to connect to the external display, and a display controller configured to assign an input/output port for receiving a supplied detection signal indicating a connection of the external display, the method comprising:

selectively supplying, by a logic circuit, either a detection signal indicating the connection of the external display to the first connector or a detection signal indicating the connection of the external display to the second connector from the extension unit through the connecting portion to the input/output port; and cutting off supply of the supplied detection signal indicating the connection of the external display to the input/output port for a first period when the extension unit is attached or detached.

9. The method of claim 8, wherein the selectively supplying comprises:

supplying the detection signal indicating the connection of the external display to the first connector when the extension unit is unattached; and supplying the detection signal indicating the connection of the external display to the second connector when the extension unit is attached.

* * * * *